United States Patent
Rak et al.

[11] Patent Number: 6,070,774
[45] Date of Patent: *Jun. 6, 2000

[54] VEHICLE ARTICLE CARRIER

[75] Inventors: Artur K. Rak, Rochester Hills; Jeffrey M. Aftanas, Sterling Heights; Donald R. Potter, Clarkston, all of Mich.

[73] Assignee: JAC Products, Inc., Ann Arbor, Mich.

[*] Notice: This patent is subject to a terminal disclaimer.

[21] Appl. No.: 09/065,844

[22] Filed: Apr. 22, 1998

Related U.S. Application Data

[63] Continuation-in-part of application No. 08/960,026, Oct. 29, 1997, Pat. No. 5,913,465.

[51] Int. Cl.[7] ............................................. B60R 9/00
[52] U.S. Cl. ............................ 224/321; 224/309; 411/7
[58] Field of Search ................................ 224/309, 315, 224/321, 322; 411/1, 7; 220/DIG. 33

[56] References Cited

U.S. PATENT DOCUMENTS

| | | | |
|---|---|---|---|
| 2,373,812 | 4/1945 | Coop | 411/6 |
| 4,295,588 | 10/1981 | Kowalski et al. | 224/321 |
| 4,364,500 | 12/1982 | Bott | 224/321 X |
| 4,448,337 | 5/1984 | Cronce . | |
| 4,469,261 | 9/1984 | Stapleton et al. . | |
| 4,500,020 | 2/1985 | Rasor . | |
| 4,588,102 | 5/1986 | Kasugai | 220/DIG. 33 X |
| 4,588,117 | 5/1986 | Bott | 224/321 |
| 4,678,097 | 7/1987 | Crute | 220/DIG. 33 X |
| 4,768,691 | 9/1988 | Stapleton | 224/321 |
| 4,854,471 | 8/1989 | Kasugai et al. | 220/DIG. 33 X |
| 4,911,348 | 3/1990 | Rasor et al . | |
| 4,913,303 | 4/1990 | Harris | 220/DIG. 33 X |
| 4,982,886 | 1/1991 | Cucheran . | |
| 5,069,377 | 12/1991 | Baughman | 224/321 X |
| 5,190,198 | 3/1993 | Cucheran . | |
| 5,205,453 | 4/1993 | Pudney et al. . | |
| 5,449,086 | 9/1995 | Harris | 220/DIG. 33 X |
| 5,553,761 | 9/1996 | Audoire et al. . | |
| 5,579,970 | 12/1996 | Cucheran et al. . | |
| 5,704,524 | 1/1998 | Stapleton . | |
| 5,794,826 | 8/1998 | Cronce et al. . | |
| 5,826,765 | 10/1998 | Rak et al. | 224/321 |
| 5,913,465 | 6/1999 | Potter et al. | 224/321 |

FOREIGN PATENT DOCUMENTS

| | | | |
|---|---|---|---|
| 108532 | 8/1917 | United Kingdom | 411/6 |

*Primary Examiner*—Gregory M. Vidovich
*Attorney, Agent, or Firm*—Harness, Dickey & Pierce, PLC

[57] ABSTRACT

A vehicle article carrier having a pair of bracket members which are disposed on a pair of slats, and where each bracket member includes a rotatable actuating member incorporating a camming mechanism for allowing each bracket member to be quickly and easily placed in locked and unlocked positions relative to its associated slat. Each bracket member includes a camming member which is threadably engaged with a threaded shaft of the actuating member. A locking member is also operably engaged with the camming member and is moved between locked and unlocked positions by movement of the camming member when an operator rotates the actuating member. The apparatus incorporates a limited number of independent component parts and the majority of the component parts are disposed within a housing of the bracket member so as not to be exposed to rain, ice, snow, etc. The bracket members therefore are able to be quickly and easily locked and unlocked relative to their respective slats to allow a cross bar secured to the bracket members to be quickly and easily repositioned along the slats. In an alternative preferred embodiment the actuating member incorporates a torque limiting mechanism which prevents an excessive tightening force from being applied by a user to the actuating member, which excessive tightening force could damage internal components of the bracket member and/or the slat.

12 Claims, 4 Drawing Sheets

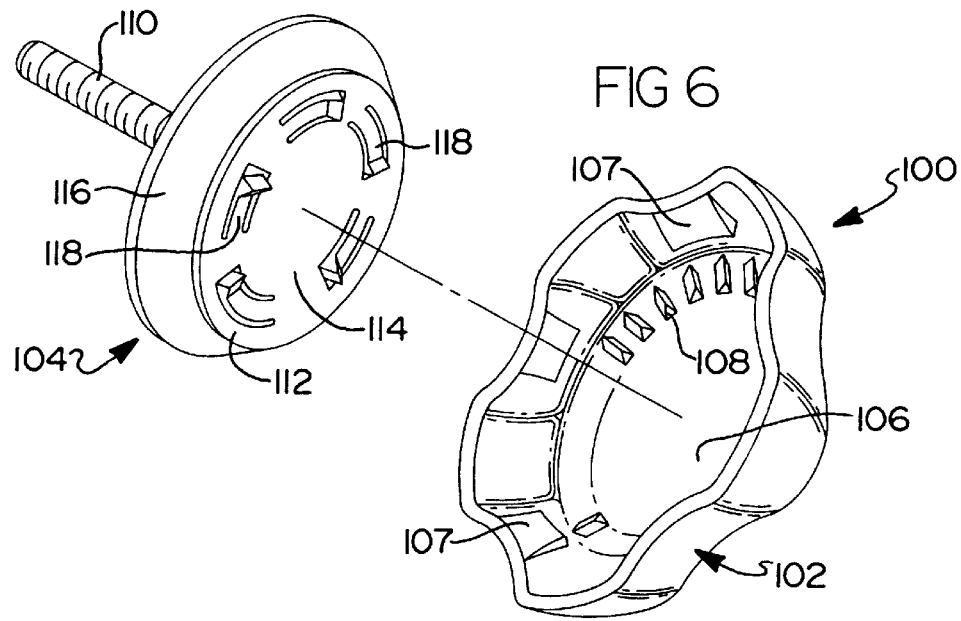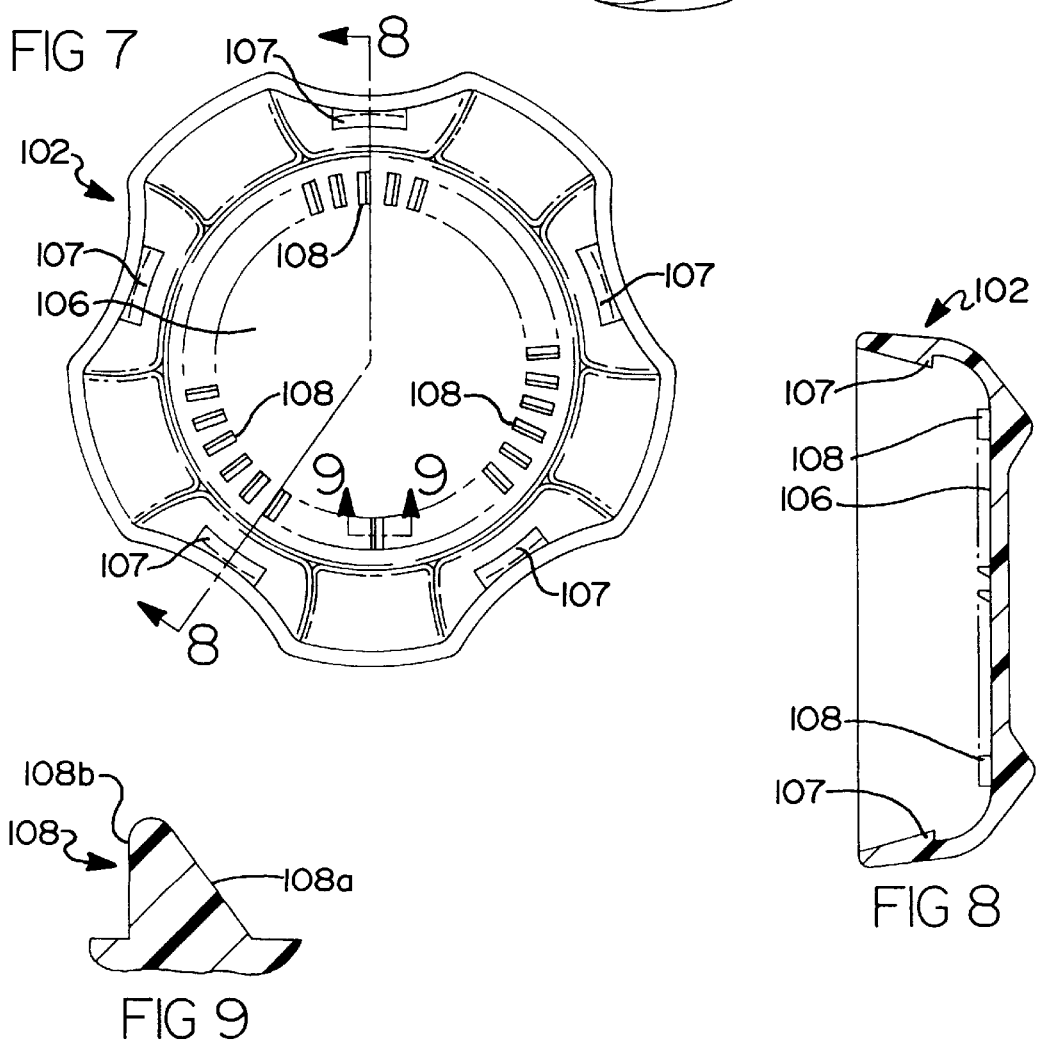

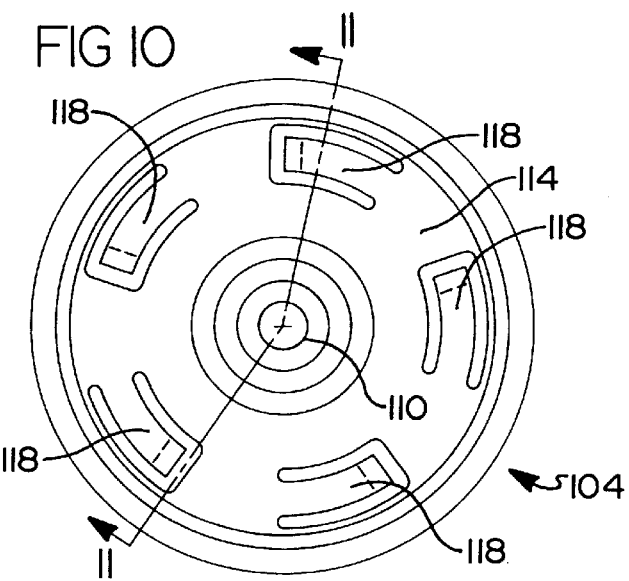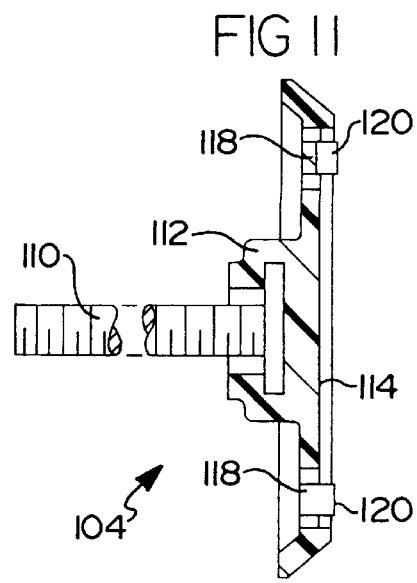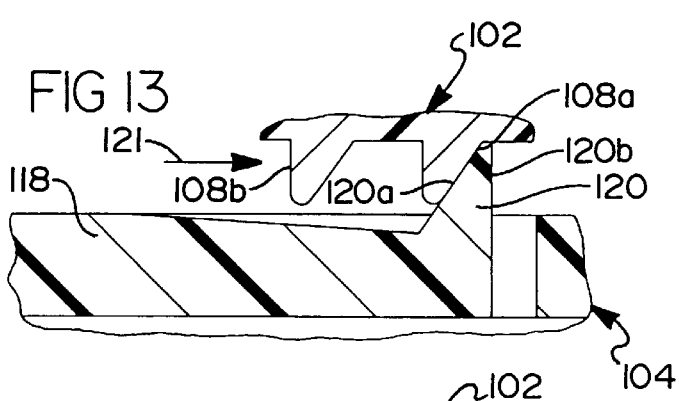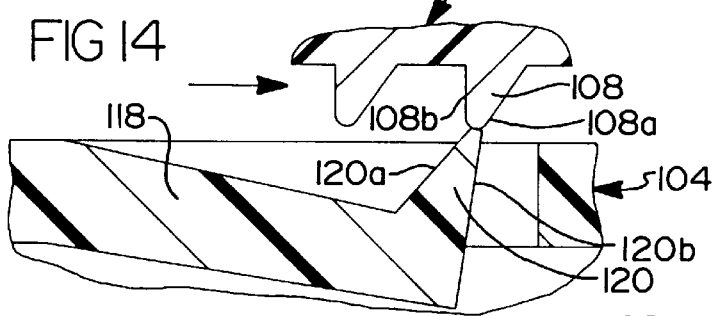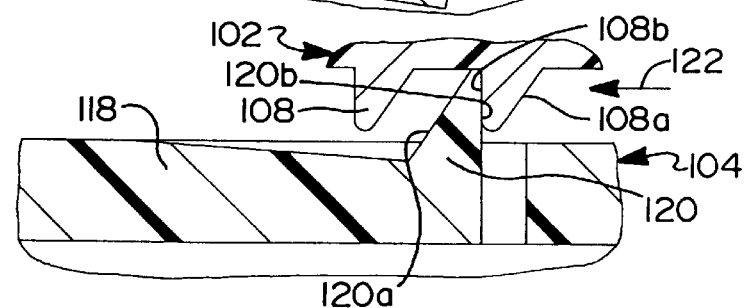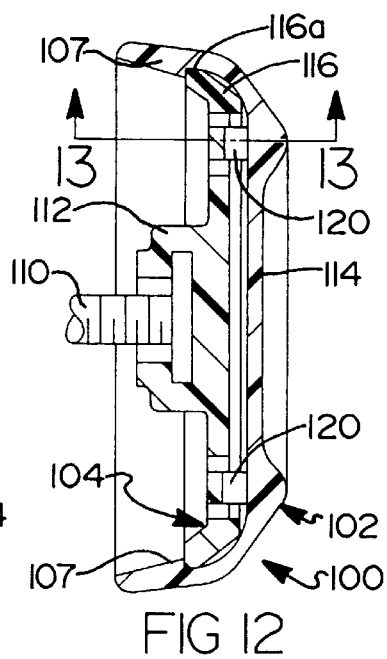

6,070,774

VEHICLE ARTICLE CARRIER

CROSS REFERENCE TO RELATED APPLICATIONS

This application is a continuation-in-part of U.S. Ser. No. 08/960,026 filed Oct. 29, 1997, now U.S. Pat. No. 5,913,465.

BACKGROUND OF THE INVENTION

1. Technical Field

This invention relates to a vehicle article carrier, and more particularly to a vehicle article carrier having a pair of bracket member which each incorporate a rotatable actuating member and an internally disposed camming member for causing the bracket members to be locked and unlocked relative to a pair of slats disposed on an outer body surface of the vehicle through operation of a rotational actuating member.

2. Discussion

Vehicle article carriers are used in a wide variety of applications to secure articles above an outer body surface of a vehicle. Such vehicle article carriers often incorporate a pair of bracket members secured to opposite ends of a cross bar. The bracket members are typically mounted on a pair of slats. In some instances, the bracket members may be releasably engageable with the slats to permit the cross bar and the pair of bracket members to be repositioned along the slats as may be needed.

While many forms of locking arrangements have been developed for use with the bracket members of a vehicle article carrier, such locking arrangements have often incorporated a relatively large number of component parts. Furthermore, previously developed locking arrangements have also often proven expensive to manufacture and/or complicated to assemble. In addition, some previously developed locking arrangements have proven to be susceptible to ice and various other elements which can interfere with the operation of such locking mechanisms.

An additional drawback of many previously developed article carrier systems if the lack of any means for limiting the torque applied by the user through an actuating member of the vehicle article carrier. Typically, the actuating member is associated with a support such as a stanchion or bracket member which is disposed on one of a pair of slats of the vehicle article carrier. The actuating member is typically used to allow the user to lock the bracket member at a desired position along the slat, and therefore enables a cross bar to be adjustably positioned along the slats as needed. The actuating member can take many forms but in one form comprises a rotatable member which the user rotates to urge the bracket member into a locked position. Unlocking the bracket member involves rotating the member in the opposite rotational direction. In some instances, however, it may be possible for the user to inadvertently overtighten the actuating member thereby making it difficult to loosen later on or possibly causing damage or unnecessary stress to other internal components of the bracket member.

Accordingly, it would be highly preferable to incorporate some form of torque limiting mechanism for use with a dial-like actuating member to limit the rotational force that a user is able to apply to the actuating member to adjust that which is necessary to securely lock the bracket member to its associated slat.

It is therefore a principal object of the present invention to provide a locking mechanism for a bracket member of a vehicle article carrier which is easy for an operator to place in locked and unlocked positions relative to the slats which support the bracket members. Furthermore, there is a need for a vehicle article carrier which is comprised of a limited number of component parts, and which is further easy to assemble and which allows a user to quickly and easily loosen the bracket members relative to their respective slats to permit a cross bar to be quickly and easily repositioned as needed.

It is a further object of the present invention to provide a locking mechanism for a bracket member of a vehicle article carrier which provides a torque limiting function to prevent an actuating member of the vehicle article carrier from accidentally being overtightened by a user.

SUMMARY OF THE INVENTION

The above and other objects are provided by a vehicle article carrier in accordance with preferred embodiments of the present invention. In one preferred embodiment the vehicle article carrier of the present invention includes a pair of slats which are adapted to be secured to an outer body surface of the vehicle. A pair of bracket members are slidably disposed on the slats. A cross bar is coupled at its two outer ends to the bracket members such that the cross bar is supported above the outer body surface of the vehicle by the bracket members.

In the above-described preferred embodiment, each bracket member includes a camming member and a locking member operably associated with the camming member. An actuating member is also operably associated with the camming member such that rotational movement of the actuating member causes the camming member to be moved within the housing. In particular, when the actuating member is rotated in a first rotational direction, the camming member moves in a manner to urge the locking member into locking engagement with an associated one of the slats which the bracket member is disposed upon. In the locked position the bracket member cannot move relative to the slat. When the actuating member is moved in a second rotational direction opposite to the first rotational direction, the camming member moves such that it causes the locking member to be moved out of locking engagement with its associated slat. The bracket member can then be moved slidably along its slat and repositioned as needed.

In the preferred embodiments the camming member comprises a block of material having a threaded bore extending at least partially therethrough. The actuating member comprises an elongated, threaded shaft which is threadably engaged within the threaded bore. Accordingly, rotational movement of the actuating member causes the camming member to move within the housing.

In an alternative preferred embodiment the vehicle article carrier includes an actuating member constructed to perform a torque limiting function. The actuating member includes a dial-like graspable member, a disc-like member rotationally secured to the dial-like member and fixedly secured to an elongated, threaded shaft. The elongated, threaded shaft is threadably engaged with a bore in the camming member to cause the camming member to move when the dial-like actuating member is rotated in clockwise and counterclockwise directions.

The torque limiting function is implemented by a plurality of circumferentially spaced teeth formed on an inner surface of the dial-like graspable member, and a plurality of flexible arm portions formed in a planar surface of the disc-like member. Each of the flexible arm portions has a tooth formed at a terminal end thereof. Each tooth on the dial-like member and each tooth at the end of each flexible arm portion are shaped such that when the dial-like member is rotated in one rotational direction, at least one tooth associated with the dial-like member engages with a tooth of one of the flexible arm portions to allow the threaded shaft to be rotated. This is so regardless of the amount of rotational torque applied in the first rotational direction. The engaging teeth also permit the elongated threaded shaft to be rotated in a second rotational direction opposite to the first rotational direction when the dial-like member is rotated in the second rotational direction. This is so up to the point where a predetermined maximum rotational torque is reached when attempting to rotate the dial-like member in the second rotational direction, whereupon the shape of the engaged teeth permit the dial-like member to disengage from the disc-like member and to rotate independently of the disc-like member without applying further rotational torque to the disc-like member. Thus, the disc-like member, and particularly the elongated threaded shaft thereof, is not able to apply a degree of torque to the locking member which would cause overtightening of the locking member and possibly damage to the vehicle article carrier slat or other components.

The preferred embodiments of the present invention thus enable a bracket member to be constructed having relatively few independent component parts. This reduces the manufacturing cost of the bracket member as well as simplifying its assembly. Since the camming member and a major portion of the locking member are disposed within the housing, they are not susceptible to the elements which could affect other forms of locking mechanisms which are exposed to ice, rain, etc. The actuating member further enables the user to quickly and easily place the bracket member in locked and unlocked positions with a minimal degree of manual effort.

BRIEF DESCRIPTION OF THE DRAWINGS

The various advantages of the present invention will become apparent to one skilled in the art by reading the following specification and subjoined claims and by referencing the following drawings in which:

FIG. 6 is a perspective view of the actuating member of an alternative preferred embodiment of the present invention, wherein the actuating member incorporates a torque limiting construction;

FIG. 7 is a plan view of an inside surface of the dial-like member shown in FIG. 6;

FIG. 8 is a cross sectional view of the dial-like member in accordance with section line 8—8 in FIG. 7;

FIG. 9 is a cross sectional side view of one tooth of the dial-like member taken in accordance with section line 9—9 in FIG. 7;

FIG. 10 is a plan view of the disc-like member shown in FIG. 6;

FIG. 11 is a cross sectional view of a portion of the disc-like member taken in accordance with section line 11—11 in FIG. 10;

FIG. 12 is a cross sectional side view illustrating the disc member secured to the dial member;

FIG. 13 is a cross sectional view in accordance with section line 13—13 in FIG. 12 illustrating engagement of one tooth of each of the disc-like member and the dial member when the dial member is rotated in the locking direction but without exceeding the predetermined torque limit;

FIG. 14 illustrates one tooth of each of the disc and dial members in the orientation they assume when an excessive torque is applied to the dial member by a user; and FIG. 15 illustrates the orientation of one tooth of each of the disc and dial members when the dial member is rotated in the unlocking direction.

DETAILED DESCRIPTION OF THE PREFERRED EMBODIMENTS

Figure 1:
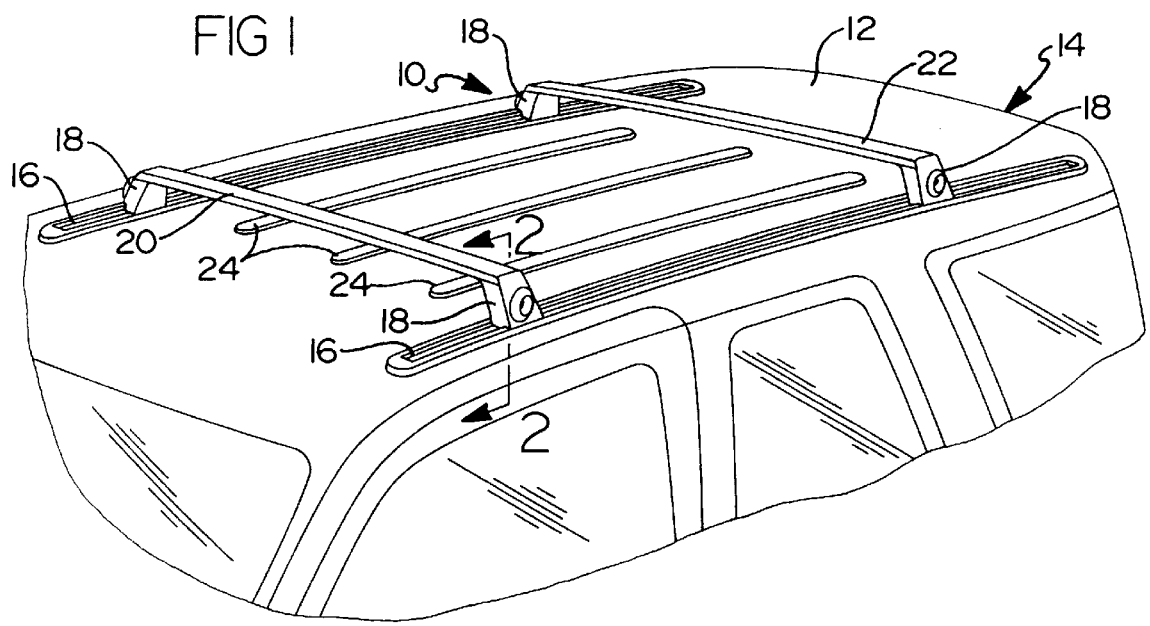
FIG. 1 is a perspective view of a portion of a vehicle incorporating a vehicle article carrier in accordance with a preferred embodiment of the present invention.

Referring to FIG. 1, there is shown a vehicle article carrier 10 in accordance with a preferred embodiment of the present invention mounted on an outer body surface 12 of the vehicle 14. The vehicle article carrier 10 includes a pair of elongated slats 16 which are fixedly secured to the outer body surface 12, bracket members 18 and cross bars 20 and 22. It will be appreciated immediately, however, that while both of cross bars 20 and 22 are adjustably positionable along the slats 16, that one or the other of the cross bars 20, 22 could just as easily be fixedly secured to the slats 16 so as to be immovable. In some applications this may be the preferred arrangement.

With further reference to FIG. 1, the vehicle article carrier 10 may optionally include a plurality of intermediate slats 24 fixedly secured to the outer body surface 12 to further help insure that articles placed on the cross bars 20 and 22 do not contact the outer body surface 12. Each of the cross bars 20 and 22 are slidably movable along the slats when its associated bracket members 18 are both in unlocked positions, as will be described in greater detail momentarily.

Figure 2:
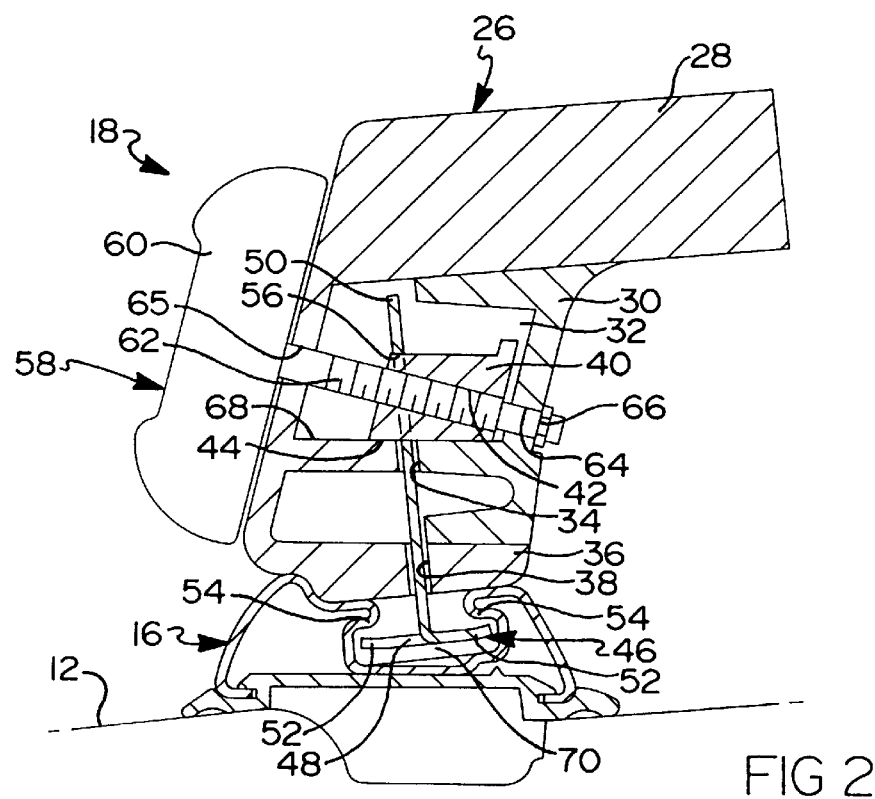
FIG. 2 is a side cross sectional view of one bracket member and a portion of its associated slat in accordance with section line 2—2 in FIG. 1, showing the bracket member in an unlocked position.

Referring to FIG. 2, each bracket member 18 can be seen to include a housing 26 comprising a main housing portion 28 and an inner housing portion 30. When assembled together, the housing portions 26 and 30 permit a cavity 32 to be formed within the housing 26. The two housing portions 26 and 30 also permit an opening 34 to be formed which communicates with the cavity 32. A base portion 36 of the housing portion 28 also includes an opening 38 formed therein generally in alignment with the opening 34.

Figure 5:
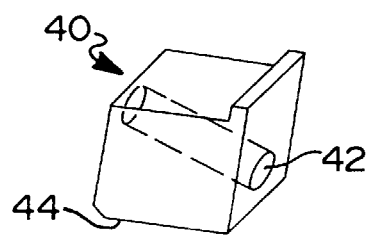
FIG. 5 is a perspective view of the camming member.

With further reference to FIG. 2, within the cavity 32 is disposed a camming member 40. The camming member is also shown in FIG. 5. With specific reference to FIG. 5, the camming member generally comprises a square-shaped solid block of plastic having a threaded bore 42 extending therethrough. The bore 42 extends at an angle relative to a bottom wall 44 of the camming member such that the bore is non-parallel or divergent from the bottom wall 44. The camming member 40 may be injection molded from a suitably high strength plastic or may be formed from other suitable materials such as powdered metal.

Figure 4:
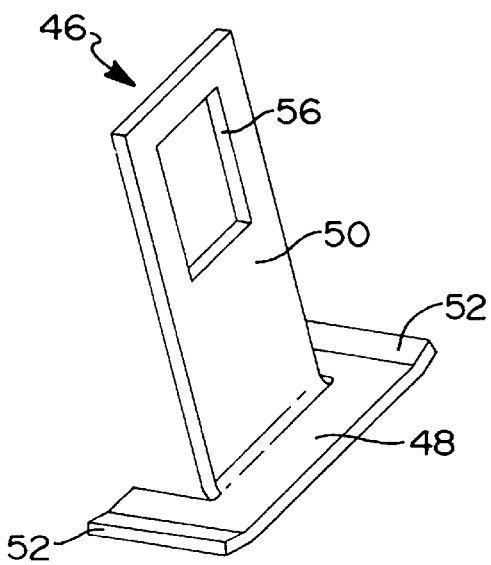
FIG. 4 is a perspective view of the locking member.

With further reference to FIG. 2, a locking member 46 extends into the cavity 32 through the opening 34 and through the opening 38 in the base portion 36 of the housing 26. The locking member 46 is also illustrated in FIG. 4 and is formed by a T-shaped member including a clamping portion 48 and a neck portion 50. The clamping portion 48 includes curved end portions 52 which are adapted to engage with interior surface portions of ledges 54 of the slat 16 (visible in FIG. 2). The neck portion 50 includes an opening 56 formed therein which is of suitable dimensions to permit the camming member 40 to extend into the opening 56 during assembly of the apparatus 10. The locking member 46 is preferably formed from a single piece of steel or other suitably strong material.

With further reference to FIG. 2, the bracket member 18 also includes an actuating member 58 comprising a manually graspable, dial-like member 60 and an elongated, threaded member 62 fixedly secured to member 60 and extending through an opening 65 in the housing portion 28. The threaded member 62 is threadably engaged within the threaded bore 42 of the camming member 40 during assembly and also preferably extends through an opening 64 in the inner housing portion 30. The threaded member 60 is secured to the housing 26 by a snap ring 66 or any other suitable means for preventing the actuating member 58 from being accidentally pulled outwardly of the housing 26. When assembled and in the unlocked position shown in FIG. 2, the bottom wall 44 of the camming member 40 rests against a floor 68 of the cavity 32 or closely adjacent thereto. The clamping portion 48 resides within a channel 70 of the slat 16 and is not in contact with the interior surface portions of the channel 70 so that the bracket member 18 can be moved freely slidably along the slat 16.

Figure 3:
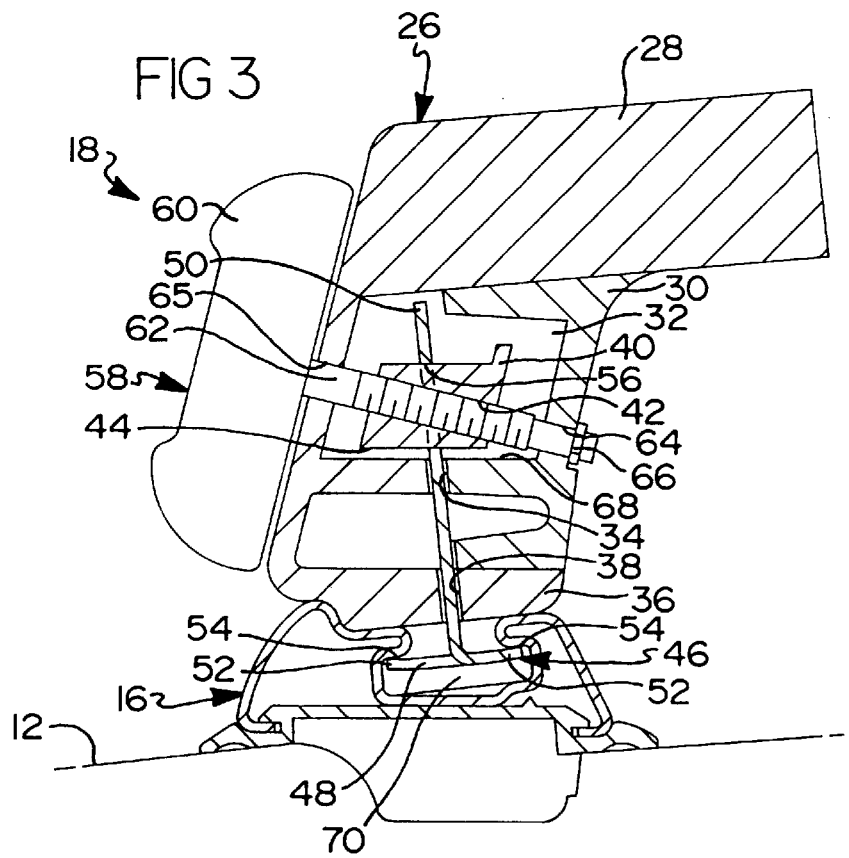
FIG. 3 is a view of the bracket member of FIG. 2 showing the bracket member in a locked position.

Referring to FIG. 3, the clamping member 46 is moved into the locked position shown in FIG. 3 by manually grasping the dial-like member 60 and rotating same. This causes the camming member 40 to be displaced or moved vertically as well as horizontally within the cavity 32. In the drawing of FIG. 3, the camming member 40 moves upwardly and to the left when the dial-like member 60 is rotated in a first or locking direction. The upward movement of the camming member 40 lifts the locking member 46 such that the clamping portion 48 engages the ledges 54 of the slat 16. Rotating the dial-like member 60 in a second or opposite rotational direction to the first direction causes the camming member 40 to be moved downwardly into the unlocked position shown in FIG. 2. Accordingly, by simply grasping the dial-like member 60 and rotating this member in one rotational direction or the other, the bracket member 18 can quickly and easily be placed in locked and unlocked positions. Since the camming member 40 and the threaded shaft 62 are disposed within the housing 26 they are not subject to ice, rain, etc. which could, over time, affect their operation.

With further reference to FIG. 3, assembly of the bracket member 18 is accomplished by first inserting the neck portion 50 of the locking member 46 through the opening 38 in the base portion 36 of the main housing 28. Next, the threaded shaft 62 of the actuating member 58 is inserted through the opening 65 and through the opening 56 in the locking member 46. The threaded shaft 62 is then threadably advanced through the camming member 40 until the camming member 40 is in the position shown in FIG. 2 and extends through the opening 56 and through opening 64 in the inner housing portion 30. At this point the inner housing portion 30 is secured to the threaded member 62 via the snap ring 66 or by other means.

The bracket members 18 of the apparatus 10 thus include a limited number of component parts and can be placed in locked and unlocked positions quickly and easily with a minimal degree of manual effort by an operator. The major component parts are primarily disposed within the housing 26 of the bracket member 18 and are therefore not subjected to ice, rain, snow and other elements which could impede their operation over time.

Referring now to FIG. 6, there is shown an alternative embodiment of the actuating member 100. The actuating member 100 includes a dial-like member 102 engageable with a disc-like member 104. The dial member 102 forms a cap having an inner surface 106 with a plurality of circumferentially spaced teeth 108 protruding therefrom, and a plurality of projecting shoulder portions 107. The disc 104 includes a threaded, elongated shaft 110 which is fixedly secured to a body portion 112. The body portion 112 has a planar surface 114 and a peripheral portion 116. The planar surface 114 includes a plurality of flexible arm portions 118 circumferentially spaced near an outer edge of the planar surface 114.

Referring to FIGS. 7–9, the dial member 102 can be seen in greater detail. With specific reference to FIG. 9, each tooth 108 includes a sloped portion 108a and a rear portion 108b. The functions of each of these portions will be described momentarily.

Referring now to FIGS. 10–13, the disc 104 can be seen in greater detail. Referring specifically to FIG. 13, each arm portion 118 includes a tooth 120 formed at a terminal end thereof. Each tooth 120 has a sloped side 120a and a rear side 120b. The disc member 104 is preferably manufactured from a suitably high strength plastic which imparts a degree of flexibility to the arm portions 118. The tooth 120 of each arm portion 118 is further formed such that the sloped side 120a is encountered on each tooth 120 when moving rotationally in the locking direction. As a result, when moving in the opposite rotational direction, the rear portion 120b of at least one tooth will be encountered first.

Referring now to FIG. 12, the assembled actuating member 100 can be seen. The threaded, elongated shaft 110 may be secured to the disc member 104 in a variety of ways, but is preferably insert molded so as to be held fixedly relative to the body portion 112. The projecting shoulder portions 107 engage with an edge 116a of the peripheral portion 116 such that the disc member 104 is not separable from the dial member 102. When assembled, the dial member 102 is rotatable relative to the disc member 104 when a predetermined upper torque limit is exceeded.

Referring now to FIG. 13, the operation of the actuating member 100 will be described. Initially, when the dial member 102 is rotated in a locking direction, as indicated by directional arrow 121, the sloped surface 108a of at least one tooth 108 makes contact with the sloped portion 120a of at least one arm portion 118. As long as the rotational torque applied by the user does not exceed a predetermined maximum torque, rotational movement of the dial member 102 causes a concurrent rotational movement of the disc member 104. This causes rotational movement of the elongated, threaded shaft 110 (FIG. 12) in the locking direction which allows the camming member 40 to be urged upwardly and to the left in the drawing of FIG. 2, thereby causing the locking member 46 to be drawn into locking engagement with ledges 54 of the slat 16.

Should the user apply an excessive rotational torque to the dial member 102 in the locking direction which exceeds the predetermined maximum rotational torque allowed, the arm portion 118 flexes to allow the tooth 108 to ride over the tooth 120, as illustrated in FIG. 14. Thus, once the predetermined maximum torque is reached, a further application of rotational torque in the locking direction to the dial member 102 will simply cause rotation of the dial member without any further rotation of the disc member 104. Put differently, the dial member 102 will enter an overrunning mode or orientation where the dial member 102 will rotate freely independently of the disc member 104.

Referring now to FIG. 15, when the dial member 102 is rotated in the unlocking direction, as indicated by arrow 122, the rear portion 108b of one tooth 108 contacts the rear portion 120b of one tooth 120 to permit the full torque applied by the user to the dial member 102 to be applied to the disc member 104. This causes the disc member 104 to be rotated in accordance with the dial member 102 in the unlocking direction of arrow 122. This causes the elongated, threaded member 110 to be rotated in the unlocking direction, which causes the camming member 40 to be moved downwardly and to the right in the drawing of FIG. 2 to unlock the locking member 46 from the slat 16.

The actuating member 100 of the present invention thus prevents its associated bracket member 18 from being overtightened to the point where damage to internal components of the bracket member 18 or to its associated slat 16 may result. The maximum predetermined torque that can be exerted on the dial member 102 is determined by several factors including the dimensions of the arm portions 118, the specific material of the disc member 104 and the angle of the sloped portion 120a of each tooth 120, and the angle of portion 108a of each tooth 108. Although this angle may vary considerably, in the preferred embodiment it is preferably within a range of about 30–60°, and more preferably about 45°.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles above an outer body surface of the vehicle, said apparatus comprising:
    a pair of slats adapted to be secured to said outer body surface;
    at least one cross bar;
    a pair of bracket members slidably supported on said slats for supporting said cross bar on said slats above said outer body surface and for securing said cross bar to said slats at a desired longitudinal position along said slats;
    each of said bracket members including:
        a housing;
        a locking member disposed within said housing and having a portion engageable with its associated said slat for releasably securing said housing to said associated slat;
        an enlarged, rotatable actuating member adapted to be manually grasped directly with the fingers of a hand of a user without the use of an external tool, the actuating member being operably associated with said locking member and rotatable in a first direction to cause said locking member to be urged into a locked position relative to its associated said slat, wherein its associated said bracket member is immovably secured to said associated slat, from an unlocked position wherein said bracket member is freely moveable along said associated slat, and said actuating member being rotatable in a second direction opposite of said first direction to urge said locking member from said locked position into said unlocked position; and
        a torque limiting assembly for limiting the rotational force that a user can apply to said actuating member when rotating said actuating member in said first direction to thereby prevent
        overtightening of said locking member relative said associated slat;
    wherein said locking member comprises a T-shaped locking member having a clamping portion and a neck portion, said neck portion including an opening formed therein; and
    wherein each said bracket member further comprises a cavity formed in said housing and a camming member movably disposed within said cavity; said opening of said neck portion being adapted to receive said camming member.

2. The apparatus of claim 1, wherein said torque limiting assembly comprises a torque transmitting surface and a torque limiting member each being operably associated with said actuating member; and
    said torque limiting member engaging said torque transmitting surface of said actuating member when said actuating member is rotated to transmit rotational torque applied to a shaft of said torque limiting member until a predetermined upper torque limit is reached, whereupon said torque transmitting surface can be rotated freely in said first direction without transmitting an additional quantity of torque to said shaft; and
    wherein said torque limiting member engages said torque transmitting surface when said actuating member is rotated in said second direction and transmits rotational torque to said locking member regardless of the degree of torque applied to said actuating member in said second direction.

3. The apparatus of claim 2, wherein said torque transmitting surface comprises a plurality of circumferentially spaced apart teeth; and
    wherein said torque limiting member comprises a plurality of circumferentially spaced flexible arm portions each having a tooth formed at a terminal end thereof.

4. The apparatus of claim 1, wherein each said bracket member further comprises:
    a cavity; and
    said camming member disposed for linear movement within said cavity and operably coupled to both said actuating member and said locking member; said camming member causing said locking member to be cammingly urged out of locking engagement with said associated slat when said actuating member is rotated in said second direction, and enabling said locking member to be urged into said locked position when said actuating member is rotated in said first direction.

5. The apparatus of claim 4, wherein said camming member comprises a threaded bore extending therethrough; and
    wherein said actuating member comprises an elongated threaded shaft adapted to engage within said threaded bore to cause said camming member to be moved within said cavity when said actuating member is rotated.

6. The apparatus of claim 1, wherein said locking member further comprises a pair of curved end portions for engaging with portions of said associated slat.

7. The apparatus of claim 5, wherein said bore in said camming member is formed at an angle so as to extend non-parallel to a bottom wall of said camming member.

8. A vehicle article carrier apparatus for supporting articles elevationally above an outer body surface of said vehicle, said apparatus comprising:

a pair of slats adapted to be secured to said outer body surface;

a cross bar;

a pair of bracket members slidably supported on said slats and disposed at opposite ends of said cross bar for supporting said cross bar on said slats above said outer body surface;

each of said bracket members comprising:

a housing having a cavity;

a camming member having a threaded bore extending therethrough;

a locking member operably associated with said camming member such that said camming member is able to move linearly slidably relative to said locking member, said locking member including a clamping portion adapted to clampingly engage with an associated one of said slats when said locking member is in a locked position, and to be positioned out of contact with said associated one of said slats when said locking member is in an unlocked position;

a rotatable actuating member protruding from said housing and adapted to be grasped directly by a hand of an individual without the need for an external tool, said actuating member having an elongated member engaged with said camming member so as to be operable to move said camming member within said cavity when said actuating member is rotated in first and second rotational directions;

said actuating member causing said camming member to urge said locking member into clamping engagement with an associated one of said slats when rotated in said first direction, and causing said locking member to be urged out of locking engagement with said associated slat when rotated in said second direction; and a torque limiting apparatus operably associated with said actuating member for limiting the rotational torque capable of being applied by a user to said actuating member when rotating said actuating member in said first direction.

9. The apparatus of claim 8, wherein said camming member includes a threaded bore extending therethrough; and wherein said actuating member includes a threaded shaft in engagement with said threaded bore.

10. The apparatus of claim 9, wherein said threaded bore of said camming member extends non-parallel to a bottom wall of said camming member to cause said camming member to be displaced laterally and vertically within said cavity when said actuating member is rotated in said first and second directions.

11. The apparatus of claim 8, wherein said torque limiting apparatus comprises a torque limiting member operably associated with said actuating member, said torque limiting member having a plurality of flexible arm portions formed in a planar surface thereof; each said flexible arm portion having a tooth at a terminal end thereof; and wherein said actuating member comprises an inner surface having a pair of circumferentially arranged teeth disposed so as to be engaged with said teeth of said torque limiting member such that torque transmitted to said elongated member of said actuating member when said actuating member is rotated in said first direction is limited to a maximum predetermined torque.

12. A vehicle article carrier apparatus for supporting articles elevationally above an outer body surface of a vehicle, said apparatus comprising:

a pair of slats adapted to be secured to said outer body surface, each said slat having a channel formed therein;

a cross bar for supporting articles thereon above said outer body surface;

a pair of bracket members slidably supported on said slats and disposed at opposite ends of said cross bar for supporting said cross bar on said slats above said outer body surface;

each of said bracket members comprising:

a housing comprising a main housing portion and an inner housing portion defining a cavity therebetween;

a camming member disposed within said cavity of said housing;

a locking member having a neck portion projecting into said cavity and a clamping portion extending outwardly of said housing into said channel of an associated one of said slats, said neck portion having an opening formed therein for receiving said camming member;

said camming member further including a threaded bore extending at least partially therethrough and being movable generally linearly;

an actuating member having an elongated, threaded member in threaded engagement with said threaded bore of said camming member;

said actuating member being directly manually graspable by a plurality of fingers of a hand of a user, and without the need for any external tool, and rotatable in a first direction to cause said camming member to be displaced vertically and laterally within said cavity, thereby urging said locking member in a first direction into locking engagement with said channel of said associated slat;

said actuating member further being rotatable in a second direction opposite to said first direction to cause said camming member to be moved vertically and laterally within said cavity, and slidably relative to said locking member, thereby causing said locking member to be urged out of clamping engagement with said channel of said associated slat;

said actuating member including a dial member having an inner surface and an independent disc member, said disc member being fixedly secured to said elongated threaded member and having a plurality of circumferentially spaced, flexible arm portions each having a tooth portion at a terminal end thereof; and said inner surface having a plurality of circumferentially spaced apart teeth, said teeth engaging with said tooth portions when said actuating member is rotated in a first direction to cause rotation of said elongated threaded member up to a predetermined maximum torque, whereupon additional torque beyond said predetermined maximum torque is not transmitted to said elongated threaded member.

* * * * *